United States Patent
Huh et al.

(10) Patent No.: US 10,782,504 B2
(45) Date of Patent: Sep. 22, 2020

(54) OPTICAL IMAGING SYSTEM

(71) Applicant: SAMSUNG ELECTRO-MECHANICS CO., LTD., Suwon-si (KR)

(72) Inventors: Jae Hyuk Huh, Suwon-si (KR); Jae Hyun Baik, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/586,334

(22) Filed: May 4, 2017

(65) Prior Publication Data

US 2018/0180854 A1 Jun. 28, 2018

(30) Foreign Application Priority Data

Dec. 26, 2016 (KR) .................. 10-2016-0179152

(51) Int. Cl.
  *G02B 9/64* (2006.01)
  *G02B 13/18* (2006.01)
  *G02B 13/00* (2006.01)

(52) U.S. Cl.
  CPC ............................... *G02B 13/0045* (2013.01)

(58) Field of Classification Search
  CPC ....... G02B 9/62; G02B 13/04; G02B 13/0045
  USPC ................. 359/713, 752, 756, 757, 759
  See application file for complete search history.

(56) References Cited

U.S. PATENT DOCUMENTS

| | | | |
|---|---|---|---|
| 8,643,957 B2* | 2/2014 | Chen | G02B 13/0045 359/713 |
| 9,753,249 B2* | 9/2017 | Liao | G02B 13/0045 |
| 2011/0249349 A1 | 10/2011 | Asami | |
| 2015/0029599 A1* | 1/2015 | Huang | G02B 3/04 359/713 |
| 2015/0362703 A1 | 12/2015 | Park | |
| 2016/0054543 A1 | 2/2016 | Nabeta | |
| 2016/0124193 A1 | 5/2016 | Kim et al. | |
| 2016/0139368 A1 | 5/2016 | You | |
| 2016/0223790 A1 | 8/2016 | Liao et al. | |
| 2016/0341934 A1* | 11/2016 | Mercado | G02B 9/62 |
| 2016/0377841 A1* | 12/2016 | Kubota | G02B 13/18 359/755 |
| 2017/0153448 A1* | 6/2017 | Mori | B60R 1/081 |
| 2017/0184815 A1* | 6/2017 | Wang | G02B 5/005 |

(Continued)

FOREIGN PATENT DOCUMENTS

| | | |
|---|---|---|
| CN | 105607224 A | 5/2016 |
| CN | 207424363 U | 5/2018 |

(Continued)

OTHER PUBLICATIONS

Korean Office Action dated Apr. 24, 2018, in corresponding Korean Application No. 10-2016-0179152 (7 pages in English, 5 pages in Korean).

(Continued)

*Primary Examiner* — William Choi

(74) *Attorney, Agent, or Firm* — NSIP Law

(57) ABSTRACT

An optical imaging system includes a first lens, a second lens, a third lens, a fourth lens having a convex object-side surface, a fifth lens having a concave image-side surface, and a sixth lens, wherein the first to sixth lenses are sequentially disposed from an object side to an imaging plane. An F-number of the optical imaging system is 1.7 or less.

19 Claims, 8 Drawing Sheets

(56) References Cited

U.S. PATENT DOCUMENTS

2018/0180854 A1    6/2018  Huh et al.
2018/0188488 A1*   7/2018  Gong ................. G02B 13/0045

FOREIGN PATENT DOCUMENTS

| | | |
|---|---|---|
| JP | 2000-330014 A | 11/2000 |
| JP | 2011-237750 A | 11/2011 |
| JP | 2015-197615 A | 11/2015 |
| KR | 10-2015-0144678 A | 12/2015 |
| KR | 10-2016-0051469 A | 5/2016 |
| KR | 10-2016-0058593 A | 5/2016 |

OTHER PUBLICATIONS

Korean Office Action dated Oct. 31, 2018 in corresponding Korean Patent Application No. 10-2016-0179152 (4 pages in English and 3 pages in Korean).

Korean Office Action dated May 14, 2019 in counterpart Korean Patent Application No. 10-2016-0179152 (6 pages in English and 4 pages in Korean).

Notice of Dismissal for Amendment dated Sep. 4, 2019 in corresponding Korean Patent Application No. 10-2016-0179152.

Chinese Office Action dated Nov. 21, 2019 in corresponding Chinese Patent Application No. 201710537219.9 (10 pages in English, 8 pages in Chinese).

Korean Office Action dated Dec. 20, 2019 in related Korean Patent Application No. 10-2019-0161312 (8 pages in English, 5 pages in Korean).

* cited by examiner

OPTICAL IMAGING SYSTEM

CROSS-REFERENCE TO RELATED APPLICATIONS

This application claims benefit of priority under 35 U.S.C. § 119(a) to Korean Patent Application No. 10-2016-0179152 filed on Dec. 26, 2016 in the Korean Intellectual Property Office, the disclosure of which is incorporated herein by reference in its entirety for all purposes.

BACKGROUND

1. Field

The present disclosure relates to an optical imaging system including six lenses.

2. Description of Related Art

Small camera modules may be mounted in mobile communications terminals. For example, small camera modules may be mounted in devices having a thin width, such as mobile phones. Such small camera modules typically include an optical imaging system including a small number of lenses allowing for reducing the width of the device. For example, an optical imaging system of a small camera module may include four lenses or fewer.

However, an optical imaging system as described above may have a high F-number, which may make it difficult for the optical imaging system to be used in a small, high-performance camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, an optical imaging system includes a first lens, a second lens, a third lens, a fourth lens having a convex object-side surface, a fifth lens having a concave image-side surface, and a sixth lens. The first to sixth lenses are sequentially disposed from an object side to an imaging plane. An F-number of the optical imaging system is 1.7 or less.

The first lens of the optical imaging system may have a concave image-side surface. The second lens of the optical imaging system can have a positive refractive power. The third lens of the optical imaging system may have a refractive index of 1.65 or greater. The fourth lens of the optical imaging system may include a convex image-side surface. The fourth lens can have a refractive index of 1.65 or greater.

The fifth lens of the optical imaging system may have a negative refractive power. The fifth lens of the optical imaging system can have inflection points formed on an object-side surface and the image-side surface. The refractive index of the third lens of the optical imaging system may be 1.65 or greater. The sixth lens of the optical imaging system can have inflection points formed on an object-side surface and an image-side surface.

In another general aspect, an optical imaging system includes a first lens, a second lens, a third lens, a fourth lens, a fifth lens, and a sixth lens, sequentially disposed from an object side to an imaging plane. The refractive indices of the third to fifth lenses are each 1.65 or greater. One or both surfaces of each of the third to fifth lenses is aspherical.

The optical imaging system may satisfy the expression $1.5 < f1/f$ in which f represents an overall focal length of the optical imaging system and f1 represents a focal length of the first lens. The optical imaging system can satisfy the expression $TTL/f < 1.25$ in which f represents an overall focal length of the optical imaging system and TTL represents a distance from an object-side surface of the first lens to an imaging plane. The optical imaging system may satisfy the expression $0.7 < R6/f$ in which f represents an overall focal length of the optical imaging system and R6 represents a radius of curvature of an object-side surface of the third lens.

The optical imaging system may satisfy the expression $V3+V4 < 45$ in which V3 represents an Abbe number of the third lens and V4 represents an Abbe number of the fourth lens. The optical imaging system can satisfy the expression $V3+V5 < 45$ in which V3 represents an Abbe number of the third lens and V5 represents an Abbe number of the fifth lens.

In another general aspect, an optical imaging system includes a first lens having a positive refractive power, a second lens having a positive refractive power, a third lens having a negative refractive power, a fourth lens having a positive refractive power, a fifth lens having a negative refractive power, and a sixth lens having a negative refractive power. The first to sixth lenses are sequentially disposed from an object side to an imaging plane.

The optical imaging system may satisfy the expression $BFL/f > 0.15$ in which BFL represents a distance from an image-side surface of the sixth lens to the imaging plane and f represents a focal length of the optical imaging system. The optical second, third, and fourth lenses of the imaging system can each have convex object-side surfaces. The first, fifth, and sixth lens of the optical imaging system may each have a concave image-side surface.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
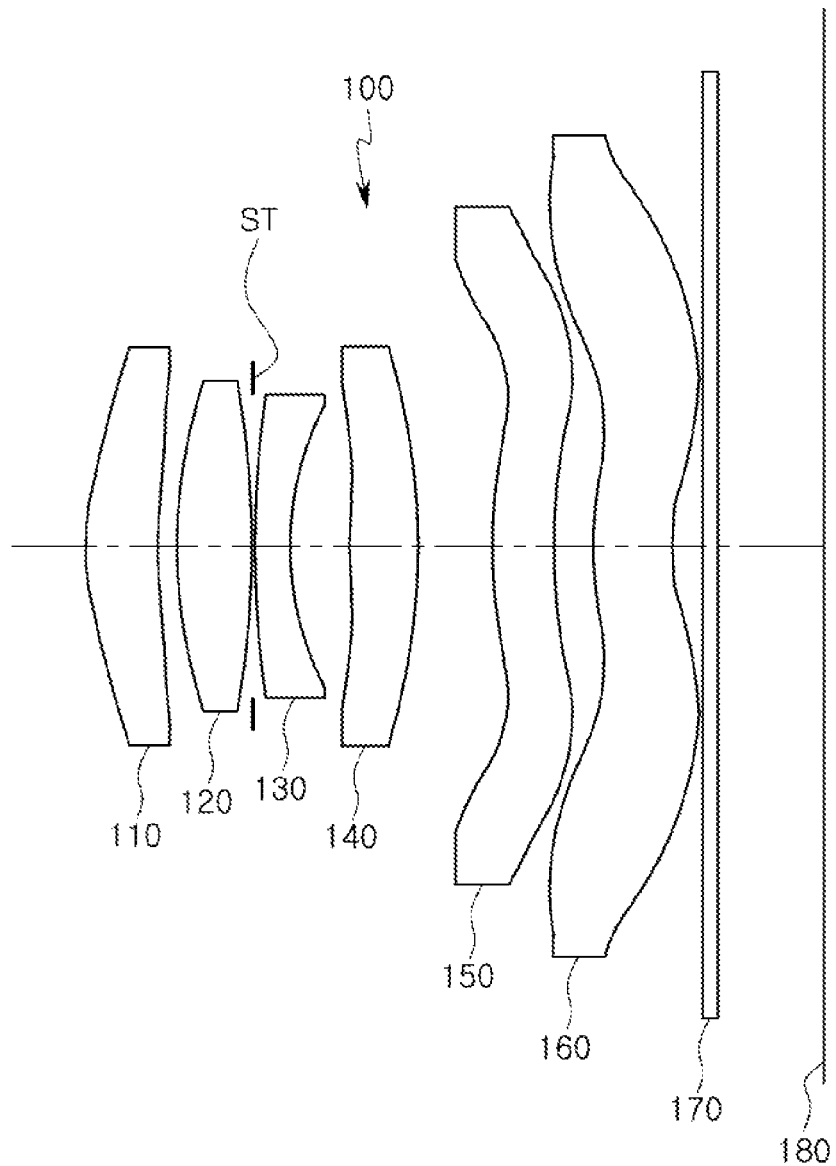
FIG. 1 is a view illustrating an optical imaging system according to a first embodiment in the present disclosure.

Hereinafter, embodiments of the present disclosure will be described in detail with reference to the accompanying drawings. An aspect of the present disclosure may provide an optical imaging system capable of being used in a high-performance, but sufficiently small, camera module.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In addition, in the present specification, a first lens refers to a lens closest to an object (or a subject), while a sixth lens refers to a lens closest to an imaging plane (or an image sensor). In addition, all of radii of curvature and thicknesses of lenses, a TTL, an IMG HT (a half of a diagonal length of the imaging plane), and focal lengths of the lenses are denoted in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Likewise, thicknesses of lenses, gaps between the lenses, OALs, TLs, SLs are distances measured based on an optical axis of the lenses.

Further, in a description of shapes of the lenses, when one surface of a lens is described as being convex, an optical axis portion of a corresponding surface is convex, and when one surface of a lens is described as being concave, an optical axis portion of a corresponding surface is concave. Therefore, even in the case that it is described that one surface of a lens is convex, an edge portion of the lens may be concave. Likewise, even in the case that it is described that one surface of a lens is concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include six lenses with a refractive power. However, the number of lenses in the optical system may vary in other embodiments, for example, between two to six lenses, while achieving one or more results and benefits described below. Also, although each lens is described with a particular refractive power, a different refractive power for at least one of the lenses may be used to achieve the intended result.

An optical imaging system may include six lenses sequentially disposed from an object side toward the imaging plane. For example, the optical imaging system may include a first lens, a second lens, a third lens, a fourth lens, a fifth lens, and a sixth lens, which are sequentially disposed.

The first lens may have a refractive power. For example, the first lens has a positive refractive power. One surface of the first lens may be concave. In an embodiment, an image-side surface of the first lens is concave.

The first lens may have an aspherical surface. For example, both surfaces of the first lens are aspherical. The first lens may be formed of a material having high light transmissivity and excellent workability. In an example, the first lens is formed of plastic. However, a material of the first lens is not limited to plastic. In another example, the first lens may be formed of glass.

The first lens has a refractive index. For example, the refractive index of the first lens is less than 1.6. The first lens has an Abbe number. In an embodiment, the Abbe number of the first lens is 50 or greater.

The second lens may have a refractive power. For example, the second lens has a positive refractive power. One surface of the second lens may be convex. In an embodiment, an object-side surface of the second lens is convex.

The second lens may have an aspherical surface. For example, both surfaces of the second lens are aspherical. The second lens may be formed of a material having high light transmissivity and excellent workability. In an example, the second lens is formed of plastic. However, a material of the second lens is not limited to plastic. In another example, the second lens may also be formed of glass.

The second lens may have a refractive index that is substantially the same as or similar to that of the first lens. For example, the refractive index of the second lens is less than 1.6. The second lens may have an Abbe number. In an embodiment, the Abbe number of the second lens is 50 or greater.

The third lens may have a refractive power. For example, the third lens may has a negative refractive power. One surface of the third lens may be convex. In an embodiment, an object-side surface of the third lens is convex.

The third lens may have an aspherical surface. For example, both surfaces of the third lens are aspherical. The third lens may be formed of a material having high light transmissivity and excellent workability. In an example, the third lens is formed of plastic. However, a material of the third lens is not limited to plastic. In another example, the third lens may be formed of glass.

The third lens may have a refractive index greater than that of the first lens. For example, the refractive index of the third lens is 1.65 or greater. The third lens may have an Abbe number less than that of the first lens. In an embodiment, the Abbe number of the third lens is 21 or less.

The fourth lens may have a refractive power. For example, the fourth lens may have a positive refractive power. One surface of the fourth lens may be convex. In an embodiment, an object-side surface of the fourth lens is convex.

The fourth lens may have an aspherical surface. For example, both surfaces of the fourth lens are aspherical. The fourth lens may be formed of a material having high light transmissivity and excellent workability. In an example, the fourth lens is formed of plastic. However, a material of the fourth lens is not limited to plastic. In another example, the fourth lens may be formed of glass.

The fourth lens may have a refractive index greater than that of the first lens. For example, the refractive index of the fourth lens is 1.65 or greater. The fourth lens may have an Abbe number less than that of the first lens. In an embodiment, the Abbe number of the fourth lens is 22 or less.

The fifth lens may have a refractive power. For example, the fifth lens has a negative refractive power. One surface of the fifth lens may be concave. In an embodiment, an image-side surface of the fifth lens is concave.

The fifth lens may have an aspherical surface. For example, both surfaces of the fifth lens are aspherical. The fifth lens may have inflection points. In an embodiment, one or more inflection points are formed on an object-side surface and the image-side surface of the fifth lens.

The fifth lens may be formed of a material having high light transmissivity and excellent workability. In an example, the fifth lens is formed of plastic. However, a material of the fifth lens is not limited to plastic. In another example, the fifth lens may be formed of glass.

The fifth lens may have a refractive index greater than that of the first lens. For example, the refractive index of the fifth lens is 1.65 or greater. The fifth lens may have an Abbe number less than that of the first lens. In an embodiment, the Abbe number of the fifth lens is 22 or less.

The sixth lens may have a refractive power. For example, the sixth lens has a negative refractive power. One surface of the sixth lens may be concave. In an embodiment, an image-side surface of the sixth lens is concave. The sixth lens may have inflection points. As examples, one or more inflection points are formed on both surfaces of the sixth lens.

The sixth lens may have an aspherical surface. For example, both surfaces of the sixth lens are aspherical. The sixth lens may be formed of a material having high light transmissivity and excellent workability. As an example, the sixth lens is formed of plastic. However, a material of the sixth lens is not limited to plastic. In another example, the sixth lens may be formed of glass.

The sixth lens may have a refractive index that is substantially similar to that of the first lens. For example, the refractive index of the sixth lens is less than 1.6. The sixth lens may have an Abbe number greater than that of the fifth lens. In an embodiment, the Abbe number of the sixth lens is 50 or greater.

The first to sixth lenses may have an aspherical shape, as described above. For example, one or both surfaces of all of the first to sixth lenses are aspherical. Here, an aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{[Equation 1]}$$

Here, c represents an inverse of a radius of curvature of the lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system may further include a stop. The stop may be disposed between the second and third lenses. The optical imaging system may further include a filter. The filter may partially filter wavelengths of light from incident light incident through the first to sixth lenses. For example, the filter filters infrared wavelengths of the incident light.

The optical imaging system may further include an image sensor. The image sensor may provide the imaging plane on which light refracted by the lenses may be imaged. For example, a surface of the image sensor forms the imaging plane. The image sensor may be configured to implement a high level of resolution.

The optical imaging system may satisfy the following Conditional Expressions:

| | |
|---|---|
| $1.5 < f1/f$ | [Conditional Expression 1] |
| $0.5 < f2/f < 1.5$ | [Conditional Expression 2] |
| $-1.5 < f3/f < 0.5$ | [Conditional Expression 3] |
| $-10 < V1 - V2 < 10$ | [Conditional Expression 4] |
| $-10 < V3 - V4 < 10$ | [Conditional Expression 5] |
| $-10 < V3 - V5 < 10$ | [Conditional Expression 6] |
| $TTL/f < 1.25$ | [Conditional Expression 7] |
| $4.8 < Nd3 + Nd4 + Nd5$ | [Conditional Expression 8] |
| $1.0 < f1/f2 < 3.0$ | [Conditional Expression 9] |
| $-3.0 < f2/f3 < -0.5$ | [Conditional Expression 10] |
| $0.15 < BFL/f$ | [Conditional Expression 11] |
| $D2/f < 0.08$ | [Conditional Expression 12] |
| $0.3 < R1/f$ | [Conditional Expression 13] |
| $0.7 < R6/f$ | [Conditional Expression 14] |
| $V3 + V4 < 45$ | [Conditional Expression 15] |
| $V3 + V5 < 45$ | [Conditional Expression 16] |
| F-number ≤ 1.7. | [Conditional Expression 17] |

Here, f represents an overall focal length of the optical imaging system, f1 represents a focal length of the first lens, f2 represents a focal length of the second lens, and f3 represents a focal length of the third lens. In Conditional Expression 4-6, 15, and 16, V1 represents an Abbe number of the first lens, V2 represents an Abbe number of the second lens, V3 represents an Abbe number of the third lens, V4 represents an Abbe number of the fourth lens, V5 represents an Abbe number of the fifth lens, and V6 represents an Abbe number of the sixth lens. In Conditional Expressions 7, 8 and 11, TTL represents a distance from an object-side surface of the first lens to the imaging plane, Nd3 represents a refractive index of the third lens, Nd4 represents a refractive index of the fourth lens, Nd5 represents a refractive index of the fifth lens, and BFL represents a distance from the image-side surface of the sixth lens to the imaging plane. In Conditional Expressions 12-14, D2 represents a distance from the image-side surface of the first lens to the object-side surface of the second lens, R1 represents a radius of curvature of the image-side surface of the first lens, and R6 represents a radius of curvature of the object-side surface of the third lens.

Conditional Expression 1 is a parametric ratio for implementing a bright optical system. For example, in cases in which f1/f is outside of a lower limit of Conditional Expression 1, it may not be easy to implement an optical imaging system having a low F-number.

Conditional Expression 2 is a parametric ratio for accomplishing an aberration correction effect through the second lens. For example, in cases in which f2/f is outside of upper and lower limits of Conditional Expression 2, a refractive power of the second lens may be excessively great or small, which in turn may make it difficult to correct aberration through the second lens.

Conditional Expression 3 is a parametric ratio for accomplishing an aberration correction effect through the third lens. For example, in cases in which f3/f is outside of upper and limits of Conditional Expression 3, a refractive power of the third lens may be excessively great or small, which in turn may make it difficult to correct aberration through the third lens.

Conditional Expression 4 uses parameters for accomplishing a chromatic aberration correction effect through the first lens and the second lens. For example, in cases in which V1 minus V2 satisfies a numerical range of Conditional Expression 4, a combination of the first lens and the second lens may be advantageous in correcting chromatic aberrations, which can enable implementation of an optical imaging system having a low F-number and a small TTL.

Conditional Expression 5 uses parameters for accomplishing a chromatic aberration correction effect through the third lens and the fourth lens. For example, in cases in which V3 minus V4 satisfies a numerical range of Conditional Expression 5, a combination of the third lens and the fourth lens may be advantageous in correcting chromatic aberrations, which can enable implementation of an optical imaging system having a low F-number and a small TTL.

Conditional Expression 6 uses parameters for accomplishing a chromatic aberration correction effect through the third lens and the fifth lens. For example, in cases in which V3 minus V5 satisfies a numerical range of Conditional Expression 6, a combination of the third lens and the fifth lens may be advantageous in correcting chromatic aberrations, which can enable implementation of an optical imaging system having a low F-number and a small TTL.

Conditional Expression 7 is a parametric ratio for realizing a miniaturized optical imaging system. For example, in cases in which TTL/f is outside of an upper limit of Conditional Expression 7, a total length (TTL) of the optical imaging system may be excessively long as compared to an overall focal length of the optical imaging system, such that it may be difficult to mount the optical imaging system in a small terminal.

Conditional Expression 8 is for realizing a miniaturized optical imaging system having a low F-number. For example, in cases in which the sum of Nd3, Nd4, and Nd5 is outside of a lower limit of Conditional Expression 8, it may be difficult to implement a small optical imaging system having a low F-number and a small TTL.

Conditional Expression 9 is a parametric ratio for maintaining good aberration characteristics through the first lens and the second lens. For example, in cases in which f1/f2 does not satisfy a numerical range of Conditional Expression 9, aberration characteristics may deteriorate from a combination of the first lens and the second lens due to a refractive power of any one lens being excessively greater than that of other lenses.

Conditional Expression 10 is a parametric ratio for maintaining good aberration characteristics through the second lens and the third lens. For example, in cases in which f2/f3 does not satisfy a numerical range of Conditional Expression 10, aberration characteristics may deteriorate from a combination of the second lens and the third lens due to a refractive power of any one lens being excessively greater than that of other lenses.

Conditional Expression 11 is a parametric ratio for realizing a miniaturized optical imaging system. For example, in cases in which BFL/f is outside of a numerical range of Conditional Expression 11, it may be difficult to miniaturize the optical imaging system.

Conditional Expression 12 is a parametric ratio for maintaining good longitudinal chromatic aberration characteristics through the first lens and the second lens. For example, in cases in which D2/f does not satisfy a numerical range of Conditional Expression 12, the first lens and the second lens may be disposed excessively distant from, or close to, each other. In these instances, longitudinal chromatic aberration characteristics may deteriorate.

Conditional Expression 13 is a parametric ratio for the first lens to enhance performance of the optical imaging system. For example, in cases in which R1/f is outside of a lower limit of Conditional Expression 13, the first lens may have strong refractive power. In these instances, the refractive power is advantageous in miniaturization of the optical imaging system, but may lead to difficulties in manufacturing the first lens. Conditional Expression 14 is a parametric ratio for the third lens to enhance performance of the optical imaging system.

Next, optical imaging systems according to several embodiments will be described. First, an optical imaging system according to a first embodiment will be described with reference to FIG. 1. The optical imaging system 100 according to the first embodiment may include a plurality of lenses having refractive power. For example, optical imaging system 100 may include a first lens 110, a second lens 120, a third lens 130, a fourth lens 140, a fifth lens 150, and a sixth lens 160.

The first lens 110 has a positive refractive power. An object-side surface of lens 110 is convex and an image-side surface of lens 110 is concave. The second lens 120 has a positive refractive power and both surfaces of lens 120 are convex. The third lens 130 has a negative refractive power. An object-side surface of lens 130 is convex and an image-side surface of lens 130 is concave. The fourth lens 140 has a positive refractive power and both surfaces of lens 140 are convex.

The fifth lens 150 has a negative refractive power. An object-side surface of lens 150 is convex and an image-side surface of lens 150 is concave. In addition, inflection points may be formed on the object-side surface or the image-side surface of fifth lens 150. For example, the object-side surface of fifth lens 150 is convex in a paraxial region and is concave in the vicinity of the paraxial region. Similarly in another example, the image-side surface of fifth lens 150 is concave in the paraxial region, and is convex in the vicinity of the paraxial region. The sixth lens 160 has a negative refractive power. An object-side surface of lens 160 is convex, while an image-side surface of lens 160 is concave. In addition, inflection points may be formed on both surfaces of sixth lens 160. For example, the object-side surface of the sixth lens 160 is convex in the paraxial region and is concave in the vicinity of the paraxial region. Similarly in another example, the image-side surface of sixth lens 160 is concave in the paraxial region and is convex in the vicinity of the paraxial region.

First lens 110 and second lens 120 may have significantly low refractive indices. For example, the refractive index of first lens 110 and the refractive index of second lens 120 are 1.55 or less. The third to fifth lenses 130 to 150 may have substantially high refractive indices. In embodiments, the refractive indices of the third to fifth lenses 130 to 150 are 1.65 or greater. Sixth lens 160 may have the lowest refractive index in optical imaging system 100. As an example, the refractive index of the sixth lens 160 is 1.54 or less.

First lens 110 and second lens 120 may have the highest Abbe numbers in optical imaging system 100. For example, the Abbe numbers of first lens 110 and second lens 120 are 55 or greater. Third lens 130 may have the lowest Abbe number in optical imaging system 100. In an embodiment, the Abbe number of third lens 130 is 21 or less. Fourth lens 140 and fifth lens 150 may have significantly low Abbe numbers. As examples, the Abbe numbers of fourth lens 140 and fifth lens 150 are 23 or less. Sixth lens 160 may have an Abbe number substantially similar to that of first lens 110. For example, the Abbe number of sixth lens 160 is 50 or greater.

Optical imaging system 100 may include a stop ST. For example, stop ST is disposed between second lens 120 and third lens 130. Stop ST disposed as described above controls an amount of light incident on an imaging plane 180.

Optical imaging system 100 may include a filter 170. For example, filter 170 is disposed between sixth lens 160 and imaging plane 180. Filter 170 disposed as described above filters infrared light incident to imaging plane 180.

Optical imaging system 100 may include an image sensor. The image sensor provides imaging plane 180 on which light refracted through the lenses is imaged. In addition, the image sensor may convert an optical signal imaged on imaging plane 180 into an electrical signal.

Optical imaging system 100 configured as described above may have a low F-number. As an example, the F-number of the optical imaging system according to the present embodiment is 1.70.

Figure 2:
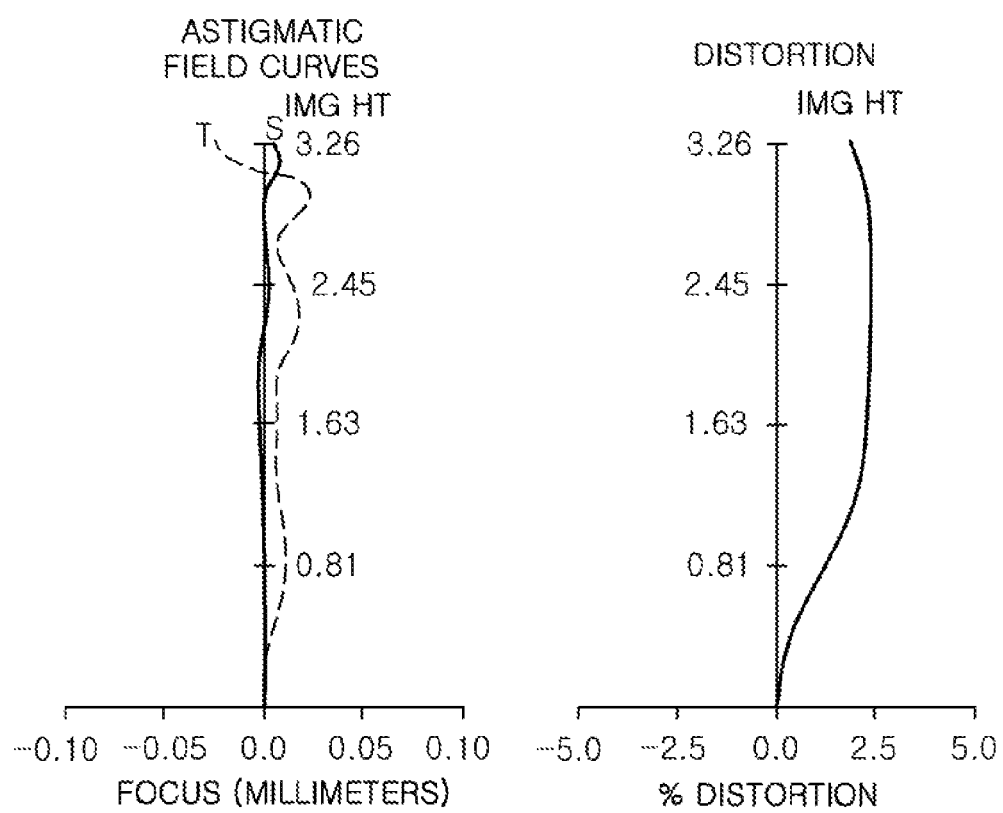
FIG. 2 is a set of graphs having curves representing aberration characteristics of the optical imaging system illustrated in FIG. 1.

The optical imaging system according to the embodiment of FIG. 1 has aberration characteristics as illustrated by the graphs in FIG. 2. Table 1 lists characteristics of lenses of the optical imaging system according to the present embodiment, and Table 2 lists aspherical characteristics of the optical imaging system according to the present embodiment.

TABLE 1

First Embodiment
F No. = 1.70 f = 4.104 TTL = 4.857

| Surface No. | Element | Radius of Curvature | Thickness/ Distance | Refractive Index | Abbe Number | Focal Length |
|---|---|---|---|---|---|---|
| S1 | First | 2.0468 | 0.4822 | 1.546 | 56.09 | 7.254 |
| S2 | Lens | 3.8988 | 0.1327 | | | |
| S3 | Second | 2.8693 | 0.4832 | 1.546 | 56.09 | 3.828 |
| S4 | Lens | −7.1455 | 0.0200 | | | |
| S5 | Stop | Infinity | 0.0000 | | | |
| S6 | Third | 6.9588 | 0.2400 | 1.667 | 20.35 | −4.206 |
| S7 | Lens | 1.9597 | 0.4218 | | | |
| S8 | Fourth | 54.3803 | 0.3916 | 1.656 | 21.53 | 29.041 |
| S9 | Lens | −28.8561 | 0.5084 | | | |
| S10 | Fifth | 2.9623 | 0.4104 | 1.656 | 21.53 | −33.838 |
| S11 | Lens | 2.4683 | 0.2537 | | | |
| S12 | Sixth | 1.5026 | 0.5186 | 1.537 | 55.71 | −44.182 |
| S13 | Lens | 1.2429 | 0.1935 | | | |
| S14 | Filter | Infinity | 0.1100 | 1.516 | 55.15 | |
| S15 | | Infinity | 0.6900 | | | |
| S16 | Imaging Plane | Infinity | 0.0000 | | | |

TABLE 2

| | Surface No. | | | | | | | | | | | |
|---|---|---|---|---|---|---|---|---|---|---|---|---|
| | S1 | S2 | S3 | S4 | S6 | S7 | S8 | S9 | S10 | S11 | S12 | S13 |
| Radius of Curvature | 2.0468 | 3.8988 | −2.7995 | −45.5055 | 40.8195 | −6.1666 | −0.1111 | −47.3382 | −1.0282 | −39.9318 | 1.5026 | 1.2429 |
| K | −1.2476 | −6.3785 | −0.0377 | 0.1428 | 0.0247 | −0.0131 | 0.1393 | −0.1244 | −0.0833 | 0.0005 | −11.1029 | −5.0263 |
| A | −0.0156 | −0.0707 | 0.0117 | −0.5712 | −0.1991 | 0.2171 | −0.4820 | 0.1085 | 0.0899 | 0.0362 | −0.2536 | −0.1745 |
| B | −0.0128 | −0.0278 | −0.2086 | 1.0037 | 0.2053 | −0.4716 | 1.2813 | −0.2389 | −0.1668 | −0.0796 | 0.1111 | 0.0998 |
| C | −0.0042 | −0.0018 | 0.5820 | −1.0820 | 0.2177 | 0.7414 | −2.0969 | 0.4542 | 0.1461 | 0.0560 | −0.0131 | −0.0463 |
| D | −0.0138 | 0.1135 | −0.6447 | 0.7074 | −0.7201 | −0.7002 | 2.0217 | −0.5226 | −0.0793 | −0.0216 | −0.0077 | 0.0148 |
| E | 0.0186 | −0.1283 | 0.3507 | −0.2498 | 0.6556 | 0.3623 | −1.0491 | 0.3594 | 0.0262 | 0.0048 | 0.0039 | −0.0029 |
| F | −0.0049 | 0.0674 | −0.0800 | 0.0334 | −0.2139 | −0.0689 | 0.0000 | −0.1333 | 0.0000 | 0.0000 | −0.0008 | 0.0003 |
| G | −0.0003 | −0.0150 | 0.0000 | 0.0000 | 0.0000 | 0.0000 | 0.0000 | 0.0000 | 0.0000 | 0.0000 | 0.0000 | 0.0000 |
| H | 0.0000 | 0.0000 | 0.0000 | 0.0000 | 0.0000 | 0.0000 | 0.0000 | 0.0000 | 0.0000 | 0.0000 | 0.0000 | 0.0000 |
| J | 0.0000 | 0.0000 | 0.0000 | 0.0000 | 0.0000 | 0.0000 | 0.0000 | 0.0000 | 0.0000 | 0.0000 | 0.0000 | 0.0000 |

An optical imaging system according to a second embodiment will be described with reference to FIG. 3. The optical imaging system 200 according to the second embodiment may include a plurality of lenses having refractive power. For example, the optical imaging system 200 includes a first lens 210, a second lens 220, a third lens 230, a fourth lens 240, a fifth lens 250, and a sixth lens 260.

The first lens 210 has a positive refractive power. An object-side surface of lens 210 is convex and an image-side surface of lens 210 is concave. The second lens 220 has a positive refractive power and both surfaces of lens 220 are convex. The third lens 230 has a negative refractive power. An object-side surface of lens 230 is convex and an image-side surface of lens 230 is concave. The fourth lens 240 has a positive refractive power and both surfaces of lens 240 are convex.

The fifth lens 250 has a negative refractive power. An object-side surface of lens 250 is convex and an image-side surface of lens 250 is concave. In addition, inflection points may be formed on the object-side surface and the image-side surface of fifth lens 250. In an embodiment, the object-side surface of fifth lens 250 is convex in a paraxial region and is concave in the vicinity of the paraxial region. Similarly in an embodiment, the image-side surface of fifth lens 250 is concave in the paraxial region and is convex in the vicinity of the paraxial region. The sixth lens 260 has a negative refractive power. An object-side surface of lens 260 is convex and an image-side surface of lens 260 is concave. In addition, inflection points may be formed on both surfaces of sixth lens 260. For example, the object-side surface of sixth lens 260 is convex in the paraxial region, and is concave in the vicinity of the paraxial region. Similarly in other embodiments, the image-side surface of sixth lens 260 is concave in the paraxial region and is convex in the vicinity of the paraxial region.

First lens 210 and second lens 220 may have significantly low refractive indices. For example, the refractive index of first lens 210 and the refractive index of second lens 220 are each 1.55 or less. The third to fifth lenses 230 to 250 may have substantially high refractive indices. In embodiments, the refractive indices of the third to fifth lenses 230 to 250 are 1.65 or greater. Sixth lens 260 may have the lowest refractive index in optical imaging system 200. For example, the refractive index of sixth lens 260 is 1.54 or less.

First lens 210 and second lens 220 may have the highest Abbe numbers in optical imaging system 200. For example, the Abbe numbers of first lens 210 and second lens 220 are 55 or greater. Third lens 230 may have the lowest Abbe number in optical imaging system 200. As an example, the Abbe number of third lens 230 is 21 or less. Fourth lens 240 and fifth lens 250 may have significantly low Abbe numbers. As other examples, the Abbe numbers of fourth lens 240 and fifth lens 250 are 23 or less. Sixth lens 260 may have an Abbe number substantially similar to that of first lens 210. In an embodiment, the Abbe number of sixth lens 260 is 50 or greater.

Optical imaging system 200 may include a stop ST. For example, stop ST is disposed between second lens 220 and third lens 230. Stop ST disposed as described above controls an amount of light incident to an imaging plane 280.

Optical imaging system 200 may include a filter 270. As an example, filter 270 is disposed between sixth lens 260 and imaging plane 280. Filter 270 disposed as described above filters infrared light incident to imaging plane 280.

Optical imaging system 200 may include an image sensor. The image sensor may provide imaging plane 280 on which light refracted through the lenses is imaged. In addition, the image sensor may convert an optical signal imaged on imaging plane 280 into an electrical signal.

Optical imaging system 200 configured as described above may have a low F-number. In an embodiment, the F-number of the optical imaging system according to the present embodiment is 1.70.

Figure 3:
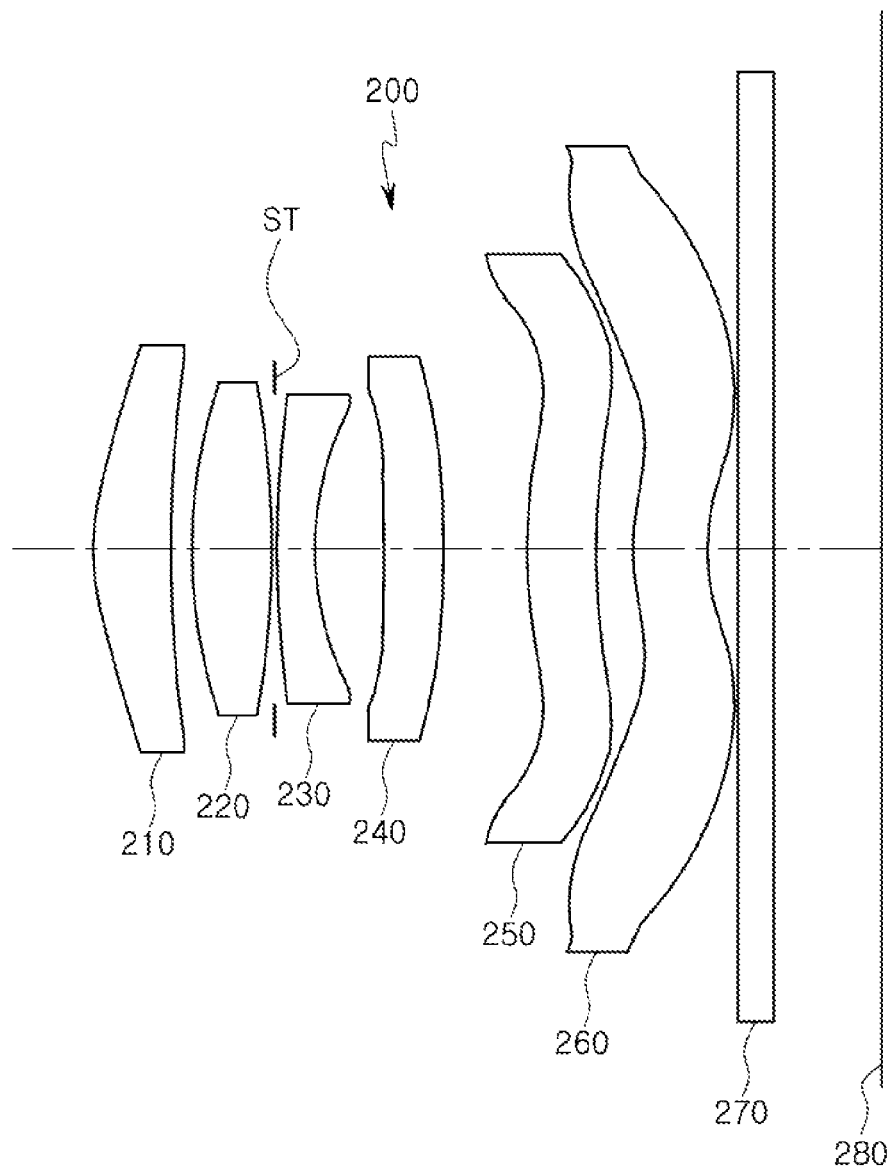
FIG. 3 is a view illustrating an optical imaging system according to a second embodiment in the present disclosure.
Figure 4:
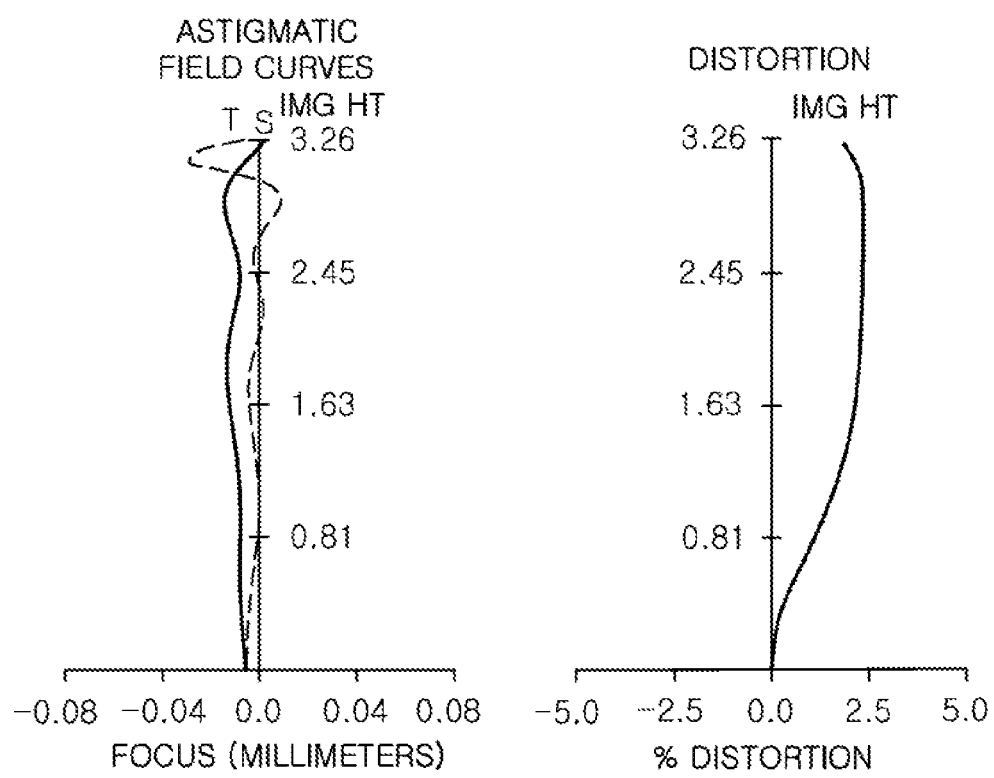
FIG. 4 is a set of graphs having curves representing aberration characteristics of the optical imaging system illustrated in FIG. 3.

The optical imaging system according to the embodiment of FIG. 3 has aberration characteristics as illustrated by the graphs in FIG. 4. Table 3 lists characteristics of lenses of the optical imaging system according to the present embodiment, and Table 4 lists aspherical characteristics of the optical imaging system according to the present embodiment.

TABLE 3

Second Embodiment
F No. = 1.70 f = 4.105 TTL = 4.839

| Surface No. | Element | Radius of Curvature | Thickness/ Distance | Refractive Index | Abbe Number | Focal Length |
|---|---|---|---|---|---|---|
| S1 | First | 2.1000 | 0.4788 | 1.546 | 56.09 | 7.059 |
| S2 | Lens | 4.2611 | 0.1300 | | | |
| S3 | Second | 2.8645 | 0.4901 | 1.546 | 56.09 | 3.998 |
| S4 | Lens | −8.4983 | 0.0200 | | | |
| S5 | Stop | Infinity | 0.0000 | | | |
| S6 | Third | 6.9565 | 0.2400 | 1.667 | 20.35 | −4.379 |
| S7 | Lens | 2.0164 | 0.4211 | | | |
| S8 | Fourth | 30.6105 | 0.3537 | 1.656 | 21.53 | 27.182 |
| S9 | Lens | −41.6544 | 0.5348 | | | |
| S10 | Fifth | 2.8698 | 0.4009 | 1.656 | 21.53 | −31.390 |
| S11 | Lens | 2.3776 | 0.2472 | | | |
| S12 | Sixth | 1.4178 | 0.4600 | 1.537 | 55.71 | −36.706 |
| S13 | Lens | 1.1728 | 0.1852 | | | |
| S14 | Filter | Infinity | 0.2100 | 1.517 | 64.20 | |
| S15 | | Infinity | 0.6625 | | | |
| S16 | Imaging Plane | Infinity | 0.0000 | | | |

TABLE 4

| | Surface No. | | | | | | | | | | | |
|---|---|---|---|---|---|---|---|---|---|---|---|---|
| | S1 | S2 | S3 | S4 | S6 | S7 | S8 | S9 | S10 | S11 | S12 | S13 |
| Radius of Curvature | 2.1000 | 4.2611 | 2.8645 | −8.4983 | 6.9565 | 2.0164 | 30.6105 | −41.6544 | 2.8698 | 2.3776 | 1.4178 | 1.1728 |
| K | −1.3011 | −4.7492 | −1.7396 | −38.3364 | 41.0805 | −6.0911 | | 0.0000 | −0.8479 | −40.9006 | −11.3538 | −5.3896 |
| A | −0.0173 | −0.0723 | −0.0334 | 0.1185 | 0.0071 | −0.0130 | −0.1198 | −0.1319 | −0.0855 | 0.0087 | −0.2846 | −0.1936 |
| B | −0.0167 | −0.0271 | 0.0033 | −0.5033 | −0.1742 | 0.2081 | 0.1199 | 0.1046 | 0.0854 | 0.0207 | 0.1265 | 0.1161 |
| C | 0.0058 | 0.0256 | −0.1500 | 0.9416 | 0.2786 | −0.4316 | −0.3363 | −0.1933 | −0.1581 | −0.0665 | −0.0145 | −0.0569 |
| D | −0.0279 | 0.0596 | 0.4787 | −1.1062 | −0.0527 | 0.7010 | 0.8207 | 0.3530 | 0.1372 | 0.0490 | −0.0094 | 0.0195 |
| E | 0.0334 | −0.0785 | −0.5648 | 0.8040 | −0.3561 | −0.7157 | −1.2719 | −0.4009 | −0.0741 | −0.0193 | 0.0048 | −0.0043 |
| F | −0.0127 | 0.0437 | 0.3223 | −0.3233 | 0.4301 | 0.4118 | 1.1688 | 0.2793 | 0.0244 | 0.0043 | −0.0010 | 0.0006 |
| G | 0.0013 | −0.0105 | −0.0773 | 0.0517 | −0.1598 | −0.0904 | −0.5730 | −0.1058 | 0.0000 | 0.0000 | 0.0000 | 0.0000 |
| H | 0.0000 | 0.0000 | 0.0000 | 0.0000 | 0.0000 | 0.0000 | 0.0000 | 0.0000 | 0.0000 | 0.0000 | 0.0000 | 0.0000 |
| J | 0.0000 | 0.0000 | 0.0000 | 0.0000 | 0.0000 | 0.0000 | 0.0000 | 0.0000 | 0.0000 | 0.0000 | 0.0000 | 0.0000 |

An optical imaging system according to a third embodiment will be described with reference to FIG. 5. The optical imaging system 300 according to the third embodiment may include a plurality of lenses having refractive power. For example, the optical imaging system 300 may include a first lens 310, a second lens 320, a third lens 330, a fourth lens 340, a fifth lens 350, and a sixth lens 360.

The first lens 310 has a positive refractive power. An object-side surface of lens 310 is convex and an image-side surface of lens 310 is concave. The second lens 320 has a positive refractive power and both surfaces of lens 320 are convex. The third lens 330 has a negative refractive power. An object-side surface of lens 330 is convex and an image-side surface of lens 330 is concave. The fourth lens 340 has a positive refractive power and both surfaces of lens 340 are convex.

The fifth lens 350 has a positive refractive power. An object-side surface of lens 350 is convex and an image-side surface of lens 350 is concave. In addition, inflection points may be formed on the object-side surface and the image-side surface of fifth lens 350. For example, the object-side surface of fifth lens 350 is convex in a paraxial region and is concave in the vicinity of the paraxial region. Similarly in an embodiment, the image-side surface of fifth lens 350 is concave in the paraxial region and is convex in the vicinity of the paraxial region. The sixth lens 360 has a negative refractive power. An object-side surface of lens 360 is convex and an image-side surface of lens 360 is concave. In addition, inflection points may be formed on both surfaces of the sixth lens 360. As an example, the object-side surface of sixth lens 360 is convex in the paraxial region and is concave in the vicinity of the paraxial region. Similarly in an example, the image-side surface of sixth lens 360 is concave in the paraxial region and is convex in the vicinity of the paraxial region.

First lens 310 and second lens 320 may have significantly low refractive indices. For example, the refractive index of first lens 310 and the refractive index of second lens 320 are each 1.55 or less. The third to fifth lenses 330 to 350 may have substantially high refractive indices. In embodiments, the refractive indices of the third to fifth lenses 330 to 350 are each 1.65 or greater. Sixth lens 360 may have the lowest refractive index in optical imaging system 300. For example, the refractive index of sixth lens 360 is 1.54 or less.

First lens 310 and second lens 320 may have the highest Abbe numbers in optical imaging system 300. As examples, the Abbe numbers of first lens 310 and second lens 320 are 55 or greater. Third lens 330 may have the lowest Abbe number in optical imaging system 300. As another example, the Abbe number of third lens 330 is 21 or less. Fourth lens 340 and fifth lens 350 may have significantly low Abbe numbers. In embodiments, the Abbe numbers of fourth lens 340 and fifth lens 350 are 23 or less. Sixth lens 360 may have an Abbe number substantially similar to that of first lens 310. For example, the Abbe number of sixth lens 360 is 50 or greater.

Optical imaging system 300 may include a stop ST. As an example, stop ST may be disposed between second lens 320 and third lens 330. Stop ST disposed as described above controls an amount of light incident to an imaging plane 380.

Optical imaging system 300 includes a filter 370. For example, filter 370 is disposed between sixth lens 360 and imaging plane 380. Filter 370 disposed as described above filters infrared light incident to imaging plane 380.

Optical imaging system 300 may include an image sensor. The image sensor may provide imaging plane 380 on which light refracted through the lenses is imaged. In addition, the image sensor may convert an optical signal imaged on imaging plane 380 into an electrical signal.

Optical imaging system 300 configured as described above has a low F-number. For example, the F-number of the optical imaging system according to the present embodiment is 1.60.

Figure 5:
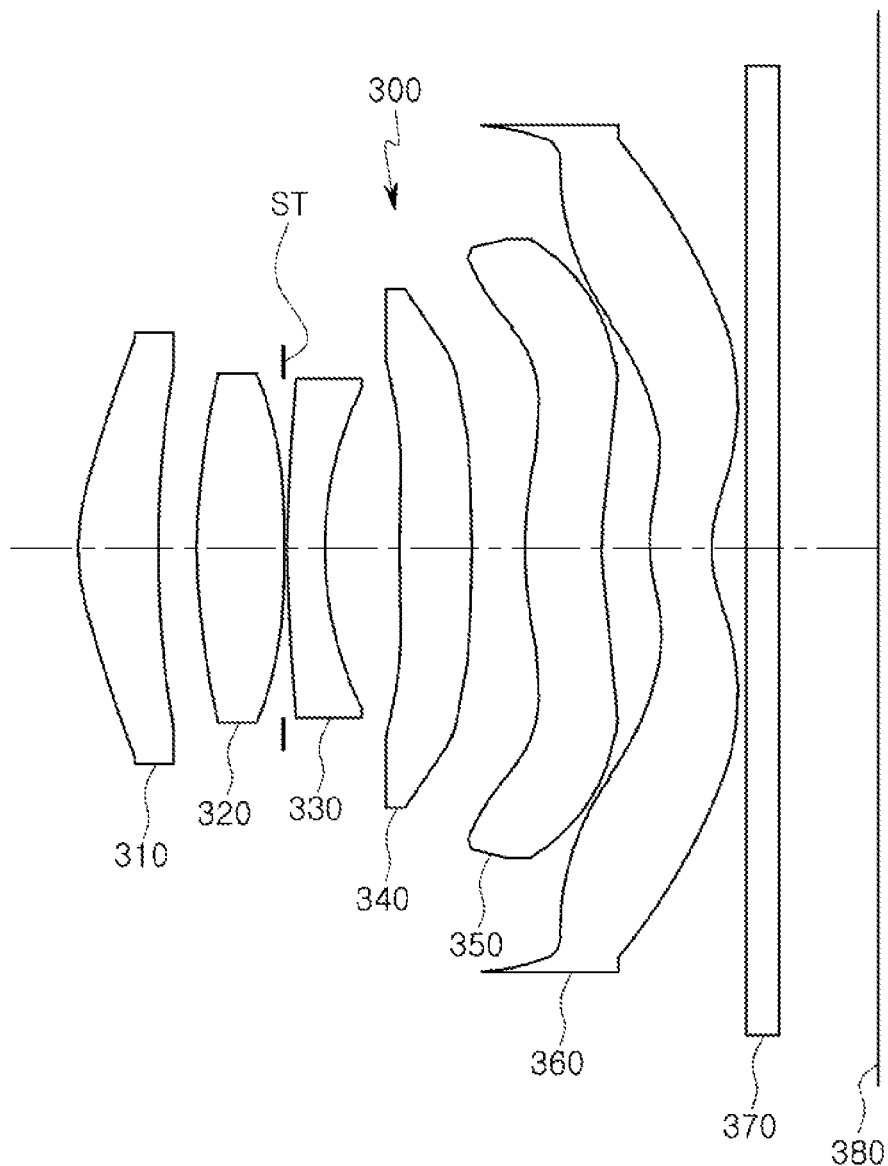
FIG. 5 is a view illustrating an optical imaging system according to a third embodiment in the present disclosure.
Figure 6:
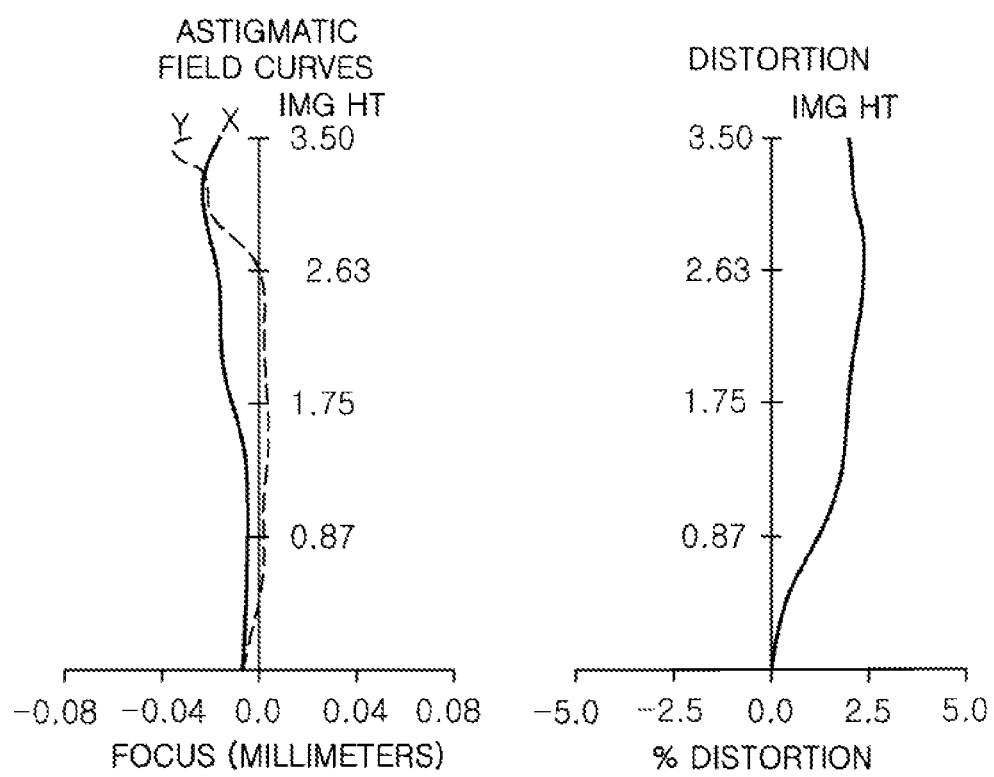
FIG. 6 is a set of graphs having curves representing aberration characteristics of the optical imaging system illustrated in FIG. 5.

The optical imaging system according to the embodiment of FIG. 5 has aberration characteristics as illustrated by the graphs in FIG. 6. Table 5 lists characteristics of lenses of the optical imaging system according to the present embodiment, and Table 6 lists aspherical characteristics of the optical imaging system according to the present embodiment.

TABLE 5

Third Embodiment
F No. = 1.60 f = 4.326 TTL = 5.204

| Surface No. | Element | Radius of Curvature | Thickness/ Distance | Refractive Index | Abbe Number | Focal Length |
|---|---|---|---|---|---|---|
| S1 | First | 2.2000 | 0.5155 | 1.546 | 56.09 | 6.917 |
| S2 | Lens | 4.8584 | 0.2492 | | | |
| S3 | Second | 4.3005 | 0.5673 | 1.546 | 56.09 | 4.610 |
| S4 | Lens | −5.7401 | 0.0200 | | | |
| S5 | Stop | Infinity | 0.0000 | | | |
| S6 | Third | 7.2235 | 0.2400 | 1.667 | 20.35 | −5.382 |
| S7 | Lens | 2.3524 | 0.5225 | | | |
| S8 | Fourth | 83.6139 | 0.4270 | 1.656 | 21.53 | 56.553 |
| S9 | Lens | −65.5350 | 0.3574 | | | |
| S10 | Fifth | 3.0298 | 0.4967 | 1.656 | 21.53 | 45.623 |
| S11 | Lens | 3.1564 | 0.3141 | | | |
| S12 | Sixth | 1.5205 | 0.3902 | 1.537 | 55.71 | −10.302 |
| S13 | Lens | 1.0851 | 0.2201 | | | |
| S14 | Filter | Infinity | 0.2100 | 1.518 | 64.20 | |
| S15 | | Infinity | 0.6535 | | | |
| S16 | Imaging Plane | Infinity | 0.0000 | | | |

TABLE 6

| | Surface No. | | | | | | | | | | | |
|---|---|---|---|---|---|---|---|---|---|---|---|---|
| | S1 | S2 | S3 | S4 | S6 | S7 | S8 | S9 | S10 | S11 | S12 | S13 |
| Radius of Curvature | 2.2000 | 4.8584 | 4.3005 | −5.7401 | 7.2235 | 2.3524 | 83.6139 | −85.5350 | 3.0298 | 3.1564 | 1.5205 | 1.0851 |
| K | −1.0659 | −1.9795 | −2.2607 | −44.3319 | 31.2128 | −8.7788 | 0.0000 | 0.0000 | −5.9984 | −49.3158 | −10.2282 | −5.1695 |
| A | −0.0118 | −0.0359 | −0.0172 | 0.0687 | 0.0053 | 0.0042 | −0.0299 | −0.0796 | −0.0478 | 0.0237 | −0.3072 | −0.2020 |
| B | −0.0010 | −0.0120 | −0.0018 | −0.3343 | −0.2074 | 0.0373 | −0.0554 | −0.0012 | 0.0026 | −0.0337 | 0.1406 | 0.1169 |
| C | −0.0182 | 0.0184 | −0.0044 | 0.5323 | 0.3002 | −0.0956 | 0.2747 | 0.0898 | −0.0300 | 0.0029 | −0.0297 | −0.0527 |
| D | 0.0223 | −0.0180 | 0.0151 | −0.5127 | −0.2182 | 0.1311 | −0.5854 | −0.1307 | 0.0280 | 0.0045 | 0.0012 | 0.0169 |
| E | −0.0187 | 0.0168 | −0.0059 | 0.3004 | 0.0773 | −0.0793 | 0.7101 | 0.1029 | −0.0164 | −0.0027 | 0.0009 | −0.0035 |
| F | 0.0093 | −0.0064 | −0.0002 | −0.0984 | −0.0036 | 0.0174 | −0.5035 | −0.0444 | 0.0060 | 0.0008 | −0.0002 | 0.0004 |
| G | −0.0018 | 0.0008 | −0.0001 | 0.0136 | −0.0037 | 0.0018 | 0.1942 | 0.0097 | 0.0000 | 0.0000 | 0.0000 | 0.0000 |

TABLE 6-continued

| | Surface No. | | | | | | | | | | | |
|---|---|---|---|---|---|---|---|---|---|---|---|---|
| | S1 | S2 | S3 | S4 | S6 | S7 | S8 | S9 | S10 | S11 | S12 | S13 |
| H | 0.0000 | 0.0000 | 0.0000 | 0.0000 | 0.0000 | 0.0000 | 0.0000 | 0.0000 | 0.0000 | 0.0000 | 0.0000 | 0.0000 |
| J | 0.0000 | 0.0000 | 0.0000 | 0.0000 | 0.0000 | 0.0000 | 0.0000 | 0.0000 | 0.0000 | 0.0000 | 0.0000 | 0.0000 |

An optical imaging system according to a fourth embodiment will be described with reference to FIG. 7. The optical imaging system 400 according to the fourth embodiment may include a plurality of lenses having refractive power. For example, the optical imaging system 400 may include a first lens 410, a second lens 420, a third lens 430, a fourth lens 440, a fifth lens 450, and a sixth lens 460.

The first lens 410 has a positive refractive power. An object-side surface of lens 410 is convex and an image-side surface of lens 410 is concave. The second lens 420 has a positive refractive power and both surfaces of lens 420 are convex. The third lens 430 has a negative refractive power. An object-side surface of lens 430 is convex and an image-side surface of lens 430 is concave. The fourth lens 440 has a positive refractive power and both surfaces of lens 440 are convex.

The fifth lens 450 has a negative refractive power. An object-side surface of lens 450 is convex and an image-side surface of lens 450 is concave. In addition, inflection points may be formed on the object-side surface and the image-side surface of fifth lens 450. In an embodiment, the object-side surface of fifth lens 450 is convex in a paraxial region and is concave in the vicinity of the paraxial region. Similarly in an embodiment, the image-side surface of fifth lens 450 is concave in the paraxial region and is convex in the vicinity of the paraxial region. The sixth lens 460 has a negative refractive power. An object-side surface of lens 460 is convex and an image-side surface of lens 460 is concave. In addition, inflection points may be formed on both surfaces of sixth lens 460. For example, the object-side surface of sixth lens 460 is convex in the paraxial region and is concave in the vicinity of the paraxial region. Similarly in an example, the image-side surface of sixth lens 460 is concave in the paraxial region and is convex in the vicinity of the paraxial region.

First lens 410 and second lens 420 may have significantly low refractive indices. In examples, the refractive index of first lens 410 and the refractive index of second lens 420 are each 1.55 or less. The third to fifth lenses 430 to 450 may have substantially high refractive indices. As examples, the refractive indices of the third to fifth lenses 430 to 450 are each 1.65 or greater. Sixth lens 460 may have the lowest refractive index in optical imaging system 400. In an embodiment, the refractive index of sixth lens 460 is 1.54 or less.

First lens 410 and second lens 420 may have the highest Abbe numbers in optical imaging system 400. For example, the Abbe numbers of first lens 410 and second lens 420 are 55 or greater. Third lens 430 may have the lowest Abbe number in optical imaging system 400. In an embodiment, the Abbe number of third lens 430 is 21 or less. Fourth lens 440 and fifth lens 450 may have significantly low Abbe numbers. For example, the Abbe numbers of fourth lens 440 and fifth lens 450 are each 23 or less. Sixth lens 460 may have an Abbe number substantially similar to that of first lens 410. In an embodiment, the Abbe number of sixth lens 460 is 50 or greater.

Optical imaging system 400 may include a stop ST. For example, stop ST is disposed between second lens 420 and third lens 430. Stop ST disposed as described above controls an amount of light incident to an imaging plane 480.

Optical imaging system 400 may include a filter 470. For example, filter 470 is disposed between sixth lens 460 and imaging plane 480. Filter 470 disposed as described above filters infrared light incident to imaging plane 480.

Optical imaging system 400 may include an image sensor. The image sensor may provide imaging plane 480 on which light refracted through the lenses is imaged. In addition, the image sensor may convert an optical signal imaged on imaging plane 480 into an electrical signal.

Optical imaging system 400 configured as described above may have a low F-number. As an example, the F-number of the optical imaging system according to the present embodiment is 1.60.

Figure 7:
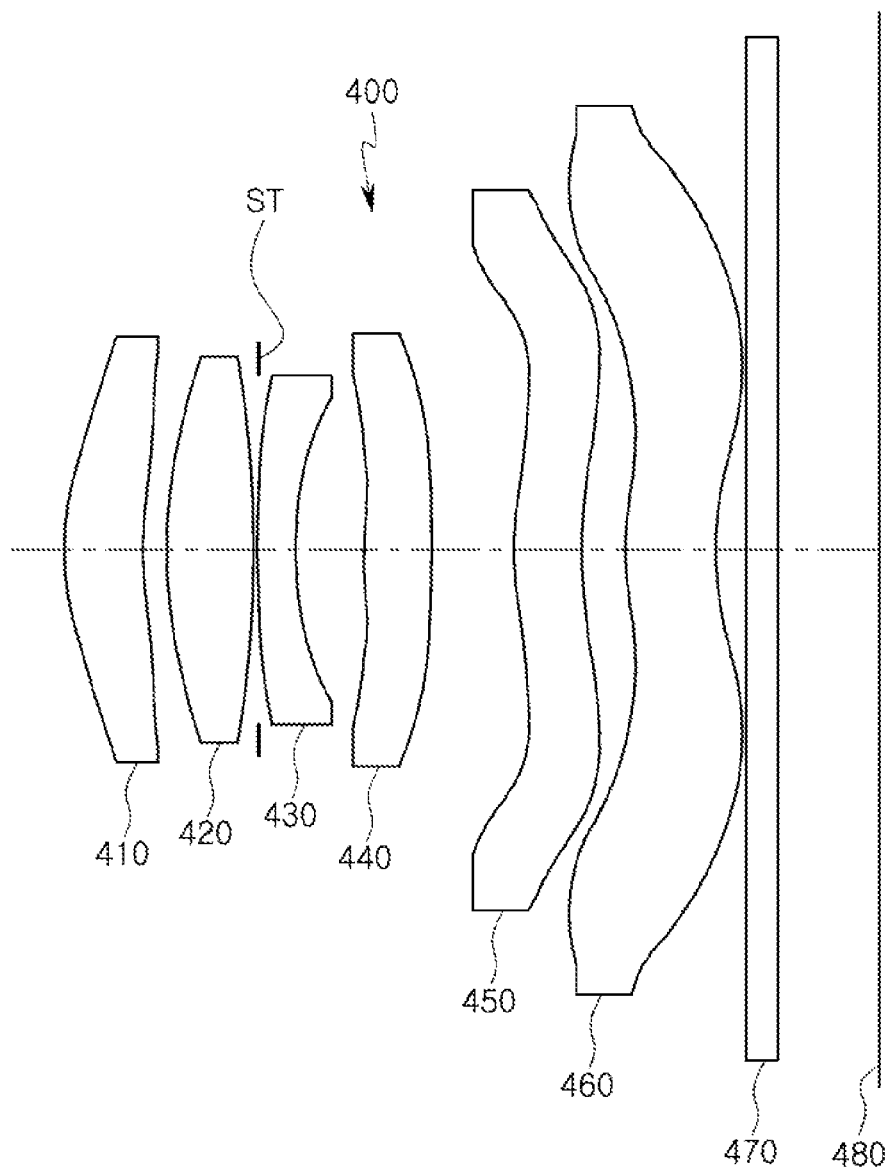
FIG. 7 is a view illustrating an optical imaging system according to a fourth embodiment in the present disclosure.
Figure 8:
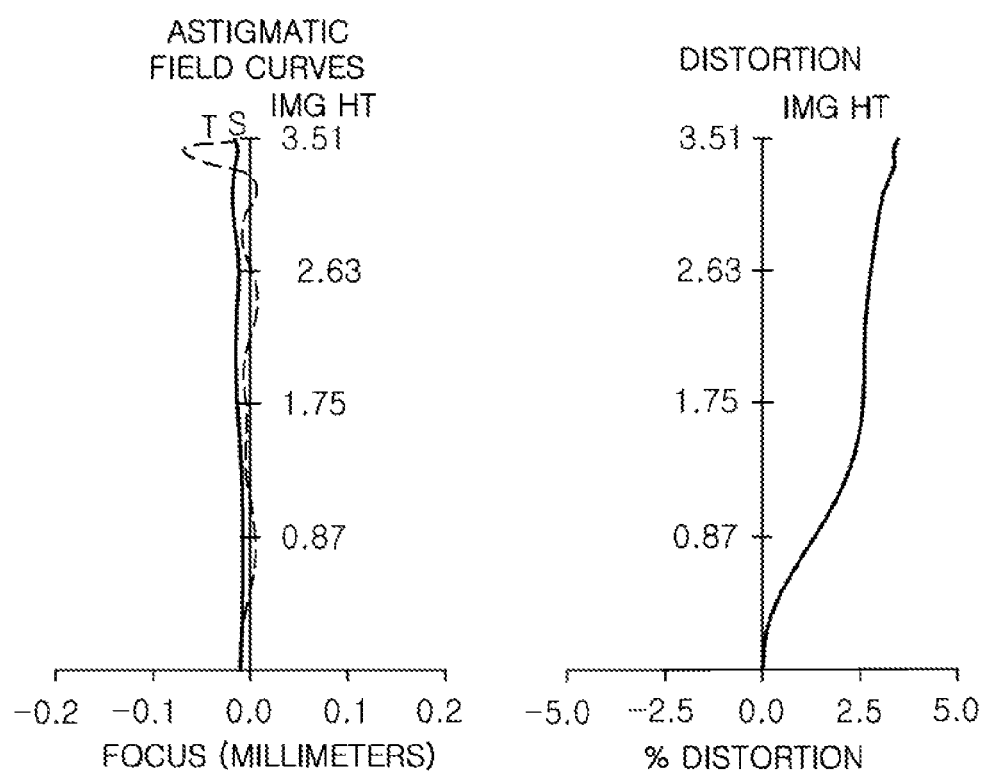
FIG. 8 is a set of graphs having curves representing aberration characteristics of the optical imaging system illustrated in FIG. 7.

The optical imaging system according to the embodiment of FIG. 7 has aberration characteristics as illustrated by the graphs in FIG. 8. Table 7 lists characteristics of lenses of the optical imaging system according to the present embodiment, and Table 8 lists aspherical characteristics of the optical imaging system according to the present embodiment.

TABLE 7

Fourth Embodiment
F No. = 1.60 f = 4.327 TTL = 5.208

| Surface No. | Element | Radius of Curvature | Thickness/ Distance | Refractive Index | Abbe Number | Focal Length |
|---|---|---|---|---|---|---|
| S1 | First | 2.1776 | 0.4976 | 1.546 | 56.09 | 8.845 |
| S2 | Lens | 3.6572 | 0.1441 | | | |
| S3 | Second | 2.6894 | 0.5643 | 1.546 | 56.09 | 3.871 |
| S4 | Lens | −8.9939 | 0.0200 | | | |
| S5 | Stop | Infinity | 0.0000 | | | |
| S6 | Third | 7.7066 | 0.2463 | 1.667 | 20.35 | −4.586 |
| S7 | Lens | 2.1483 | 0.4559 | | | |
| S8 | Fourth | 86.8308 | 0.4187 | 1.656 | 21.53 | 30.120 |
| S9 | Lens | −25.2482 | 0.5272 | | | |
| S10 | Fifth | 3.1020 | 0.4327 | 1.656 | 21.53 | −84.879 |
| S11 | Lens | 2.7755 | 0.2824 | | | |
| S12 | Sixth | 1.8002 | 0.5643 | 1.537 | 55.71 | −25.018 |
| S13 | Lens | 1.4134 | 0.2076 | | | |
| S14 | Filter | Infinity | 0.2100 | 1.518 | 64.20 | |
| S15 | | Infinity | 0.6270 | | | |
| S16 | Imaging Plane | Infinity | 0.0000 | | | |

TABLE 8

| | Surface No. | | | | | | | | | | | | |
|---|---|---|---|---|---|---|---|---|---|---|---|---|
| | S1 | S2 | S3 | S4 | S6 | S7 | S8 | S9 | S10 | S11 | S12 | S13 |
| Radius of Curvature | 2.1776 | 3.6572 | 2.6894 | −8.9939 | 7.7066 | 2.1483 | 86.8308 | −25.2482 | −1.8525 | 2.7755 | 1.8002 | 1.4134 |
| K | −1.2579 | −8.5811 | −3.0148 | −58.3944 | 39.2664 | −6.0744 | 0.0000 | 0.0000 | −0.0677 | −36.6800 | −11.2924 | −4.6357 |
| A | −0.0119 | −0.0554 | −0.0321 | 0.1224 | 0.0344 | −0.0073 | −0.0823 | −0.0956 | 0.0671 | 0.0000 | −0.1977 | −0.1366 |
| B | −0.0104 | −0.0231 | 0.0047 | −0.4526 | −0.2313 | 0.1456 | 0.0804 | 0.0655 | −0.1043 | 0.0259 | 0.0752 | 0.0659 |
| C | 0.0014 | 0.0051 | −0.0981 | 0.7558 | 0.3920 | −0.3226 | −0.2318 | −0.1157 | 0.0779 | −0.0498 | −0.0100 | −0.0254 |
| D | −0.0124 | 0.0450 | 0.2312 | −0.7591 | −0.3069 | 0.5256 | 0.5233 | 0.1862 | −0.0358 | 0.0307 | −0.0025 | 0.0065 |
| E | 0.0120 | −0.0424 | −0.2016 | 0.4557 | 0.0692 | −0.5049 | −0.7259 | −0.1811 | 0.0099 | −0.0104 | 0.0013 | −0.0010 |
| F | −0.0034 | 0.0175 | 0.0836 | −0.1497 | 0.0438 | 0.2571 | 0.5911 | 0.1056 | 0.0000 | 0.0020 | −0.0002 | 0.0001 |
| G | 0.0002 | −0.0030 | −0.0144 | 0.0203 | −0.0212 | −0.0504 | −0.2573 | −0.0331 | 0.0000 | 0.0000 | 0.0000 | 0.0000 |
| H | 0.0000 | 0.0000 | 0.0000 | 0.0000 | 0.0000 | 0.0000 | 0.0000 | 0.0000 | 0.0000 | 0.0000 | 0.0000 | 0.0000 |
| J | 0.0000 | 0.0000 | 0.0000 | 0.0000 | 0.0000 | 0.0000 | 0.0000 | 0.0000 | 0.0000 | 0.0000 | 0.0000 | 0.0000 |

Table 9 lists values of Conditional Expressions of the optical imaging systems according to the first to fourth embodiments. As can be seen in Table 9, the optical imaging systems according to the first to fourth embodiments satisfy all numerical ranges of the Conditional Expressions suggested in the detailed description of the present disclosure.

TABLE 9

| Conditional Expression | First Embodiment | Second Embodiment | Third Embodiment | Fourth Embodiment |
|---|---|---|---|---|
| f1/f | 1.7674 | 1.7195 | 1.5988 | 2.0438 |
| f2/f | 0.9326 | 0.9739 | 1.0656 | 0.8945 |
| f3/f | −1.0248 | −1.0667 | −1.2439 | −1.0597 |
| V1 − V2 | 0 | 0 | 0 | 0 |
| V3 − V4 | −1.1718 | −1.1718 | −1.1718 | −1.1718 |
| V3 − V5 | −1.1718 | −1.1718 | −1.1718 | −1.1718 |
| TTL/f | 1.1834 | 1.1788 | 1.2027 | 1.2035 |
| Nd3 + Nd4 + Nd5 | 4.9784 | 4.9784 | 4.9784 | 4.9784 |
| f1/f2 | 1.8951 | 1.7655 | 1.5003 | 2.2849 |
| f2/f3 | −0.9101 | −0.9130 | −0.8567 | −0.8441 |
| BFL/f | 0.2423 | 0.2589 | 0.2528 | 0.2437 |
| D2/f | 0.0323 | 0.0317 | 0.0576 | 0.0333 |
| R1/f | 0.4987 | 0.5115 | 0.5085 | 0.5032 |
| R6/f | 1.6955 | 1.6945 | 1.6696 | 1.7809 |
| V3 + V4 | 41.88 | 41.88 | 41.88 | 41.88 |
| V3 + V5 | 41.88 | 41.88 | 41.88 | 41.88 |
| F-number | 1.70 | 1.70 | 1.60 | 1.60 |

As set forth above, according to the embodiments in the present disclosure, an optical imaging system appropriate for a small camera module having high performance may be implemented. While embodiments have been shown and described above, it will be apparent after an understanding of this application that modifications and variations could be made without departing from the scope of the present application as defined by the appended claims.

What is claimed is:

1. An optical imaging system comprising:
 a first lens;
 a second lens;
 a third lens;
 a fourth lens comprising a convex object-side surface along an optical axis;
 a fifth lens comprising a concave image-side surface along the optical axis; and
 a sixth lens,
 wherein the first to sixth lenses are sequentially disposed from an object side toward an imaging plane,
 an F-number is 1.7 or less, and
 wherein a refractive index of the fourth lens is 1.65 or greater.

2. The optical imaging system of claim 1, wherein an image-side surface of the first lens is concave along an optical axis.

3. The optical imaging system of claim 1, wherein the second lens has a positive refractive power.

4. The optical imaging system of claim 1, wherein a refractive index of the third lens is 1.65 or greater.

5. The optical imaging system of claim 1, wherein an image-side surface of the fourth lens is convex along an optical axis.

6. The optical imaging system of claim 1, wherein the fifth lens has a negative refractive power.

7. The optical imaging system of claim 1, wherein inflection points are formed on an object-side surface and the image-side surface of the fifth lens.

8. The optical imaging system of claim 1, wherein a refractive index of the fifth lens is 1.65 or greater.

9. The optical imaging system of claim 1, wherein inflection points are formed on an object-side surface and an image-side surface of the sixth lens.

10. An optical imaging system comprising:
 a first lens, a second lens, a third lens, a fourth lens, a fifth lens, and a sixth lens, sequentially disposed from an object side toward an imaging plane,
 wherein refractive indices of the third to fifth lenses are each 1.65 or greater,
 one or both surfaces of each of the third to fifth lenses are aspherical, an image-side surface of the second lens is convex along an optical axis;

an image-side surface of the sixth lens is concave along an optical axis, and an F-number is 1.7 or less.

11. The optical imaging system of claim 10, wherein $1.5<f1/f$ in which f represents an overall focal length of the optical imaging system and f1 represents a focal length of the first lens.

12. The optical imaging system of claim 10, wherein $TTL/f<1.25$ in which f represents an overall focal length of the optical imaging system and TTL represents a distance from an object-side surface of the first lens to an imaging plane.

13. The optical imaging system of claim 10, wherein $0.7<R6/f$ in which f represents an overall focal length of the optical imaging system and R6 represents a radius of curvature of an object-side surface of the third lens.

14. The optical imaging system of claim 10, wherein $V3+V4<45$ in which V3 represents an Abbe number of the third lens and V4 represents an Abbe number of the fourth lens.

15. The optical imaging system of claim 10, wherein $V3+V5<45$ in which V3 represents an Abbe number of the third lens and V5 represents an Abbe number of the fifth lens.

16. An optical imaging system comprising:

a first lens comprising a positive refractive power;

a second lens comprising a positive refractive power and an object-side surface of the second lens is convex along an optical axis;

a third lens comprising a negative refractive power;

a fourth lens comprising a positive refractive power;

a fifth lens comprising a negative refractive power; and a sixth lens comprising a negative refractive power, wherein the first to sixth lenses are sequentially disposed from an object side toward an imaging plane, an object-side surface of the fifth lens is convex in a paraxial region, the sixth lens is a last lens of the optical imaging system before the imaging plane, and an F-number is 1.7 or less.

17. The optical imaging system of claim 16, wherein $BFL/f>0.15$ in which BFL represents a distance from an image-side surface of the sixth lens to the imaging plane and f represents a focal length of the optical imaging system.

18. The optical imaging system of claim 16, wherein an object-side surface of the third lens is convex along the optical axis, and an object-side surface of the fourth lens is convex along the optical axis.

19. The optical imaging system of claim 16, wherein an image-side surface of the first lens is concave along an optical axis, an image-side surface of the fifth lens is concave along the optical axis, and an image-side surface of the sixth lens is concave along the optical axis.

* * * * *